United States Patent [19]

Ward

[11] 3,853,742

[45] Dec. 10, 1974

[54] SELECTIVE MIDBARREL HYDROCRACKING

[75] Inventor: John W. Ward, Yorba Linda, Calif.

[73] Assignee: Union Oil Company of California, Los Angeles, Calif.

[22] Filed: July 20, 1973

[21] Appl. No.: 381,220

Related U.S. Application Data

[63] Continuation-in-part of Ser. No. 244,947, April 17, 1972, abandoned, and a continuation-in-part of Ser. No. 191,123, Oct. 20, 1971, abandoned, and a continuation-in-part of Ser. No. 209,439, Dec. 17, 1971.

[52] U.S. Cl. ............... 208/111, 252/439, 252/455 Z
[51] Int. Cl. ....................... C10g 13/02, C01b 33/28
[58] Field of Search .................. 208/111; 252/455 Z

[56] References Cited
UNITED STATES PATENTS

| | | | |
|---|---|---|---|
| 3,293,192 | 12/1966 | Maher et al. | 252/430 |
| 3,507,812 | 4/1970 | Smith et al. | 252/455 |
| 3,617,483 | 11/1971 | Child et al. | 208/59 |
| 3,764,519 | 10/1973 | Meyer | 208/111 |
| 3,781,199 | 12/1973 | Ward | 208/89 |

*Primary Examiner*—Delbert E. Gantz
*Assistant Examiner*—G. E. Schmitkons
*Attorney, Agent, or Firm*—Richard C. Hartman; Lannas S. Henderson; Michael H. Laird

[57] ABSTRACT

Midbarrel fuels boiling between about 300° and about 700°F are selectively produced from higher boiling feeds by hydrocracking in the presence of a catalyst containing a minor proportion of a zeolite, preferably with a faujasite crystal structure, having a non-uniform pore size distribution in which at least 25 percent of the pore volume is contained in pores having diameters greater than about 20 angstroms and at least about 17 percent in pores having diameters greater than about 40 angstroms.

8 Claims, No Drawings

SELECTIVE MIDBARREL HYDROCRACKING

RELATED APPLICATIONS

This application is a Continuation-In-Part of my copening applictions Ser. Nos. 244,947, filed Apr. 17, 1972; 191,123 filed Oct. 20, 1971 now abandoned; and 209,439 filed Dec. 17, 1971.

BACKGROUND

Zeolites are presently considered the most active hydrocracking catalysts. However, high activity is not the only essential characteristic of midbarrel cracking catalysts. Midbarrel selectivity —the percentage of total conversion accounted for by products boiling within the midbarrel range, e.g., about 300° to about 700°F.—is also important. In fact, many commercial midbarrel hydrocracking processes do not use zeolitic catalysts due to their relatively low midbarrel selectivity. Although the amorphous, non-crystalline catalysts are notably less active than are those containing zeolitic aluminosilicates, their use in these processes is justified by lower relative conversion to undesired products boiling below 300° or 400°F. wherever the desired product initial-boiling point may be.

Such processes obviously suffer from several disadvantages. These include the necessity of using larger amounts of catalysts, larger reactors, higher hydrogen partial pressures and total pressures to obtain the same conversion rates due to lower catalyst activity. Furthermore, the feedstocks for these processes, which usually boil above about 700°F, generally contain catalyst deactivating substances such as organonitrogen and organosulfur compounds and refractory components or refractory precursors such as polynuclear aromatics. Crystalline zeolite compositions are inhibited by these substances, particularly the organonitrogen compounds, to a greater extent than are amorphous non-zeolite catalysts. Thus, the advantage of higher activity expected with crystalline zeolites is lost, at least to a degree.

Loss of zeolite activity, crystallinity, acidity, ion exchange capacity, pore volume and surface area also result with high boiling feeds containing impurities or during regeneration. Degeneration of one or more desirable properties may also result from exposure to steam whether added directly or formed in situ. Deactivation and loss of crystalline structure and other zeolite characteristics also result from exposure to ammonia atmospheres.

I have now discovered that many of these disadvantages can be minimized by the use of a particular class of crystalline zeolites for converting high boiling feeds to midbarrel fuels. These compositions exhibit superior hydrothermal stability, midbarrel selectivity and activity. The preferred compositions are also more stable to ammonia atmospheres than are conventional zeolites.

It is therefore one object of this invention to provide an improved midbarrel hydrocracking process. Another object is to provide a method for converting hydrocarbons boiling primarily above about 700°F to lower boiling products with high midbarrel selectivity. Another object is the provision of a midbarrel hydrocracking process having both high activity and midbarrel selectivity fuels with less loss in activity during either processing or regeneration.

In accordance with one embodiment, hydrocarbons boiling primarily above about 700°F are converted with a midbarrel selectivity of at least about 50 percent. The feed is reacted with hydrogen under hydrocracking conditions in the presence of a catalytic combination of a hydrogen crystalline aluminosilicate, an amorphous refractory inorganic oxide and a hydrogenation component selected from nickel, tungsten, cobalt and molybdenum metals, oxides and sulfides. The zeolite constitutes less than about 50 weight percent of the combination based on the combined weight of the zeolite and refractory oxide and is characterized by the crystal structure of faujasite or L zeolite, a silica-to-alumina ratio of at least about 3, an alkali-metal content corresponding to less than about 1 weight percent alkali metal oxide and a pore size distribution in which at least 25 percent of the pore volume is contained in pores having diameters greater than about 20 angstroms and at least about 17 percent in pores having diameters greater than about 40 angstroms.

The feeds employed in these processes boil primarily above about 700°F. At least about 90 percent of the feed will generally boil between about 700° and about 1,200°F. Feedstocks having these characteristics include gas oils, vacuum gas oils, deasphalted residua, catalytic cracking cycle stocks, and the like. The feed to the hydrocracking zone generally contains at least about 5 ppm and usually between about 10 ppm and 0.1 weight percent nitrogen as organonitrogen compounds. It may also contain substantial amounts of mono- or polynuclear aromatic compounds corresponding to at least about 5 and generally about 5 to about 40 volume percent aromatics.

Although the catalysts employed in these methods exhibit superior stability, activity and midbarrel selectivity, reaction conditions must nevertheless be correlated to provide the desired conversion rates while minimizing conversion to less desired lower boiling products. The conditions required to meet these objectives will depend on catalyst activity and selectivity and feedstock characteristics such as boiling point range, organonitrogen and aromatic content and structure. They will also depend on the most judicious compromise of overall activity, i.e., conversion per pass and selectivity. For example, these systems can be operated at relatively high conversion rates on the order of 70, 80 or even 90 percent conversion per pass. However, higher conversion rates generally result in lower selectivity. Thus, a compromise must be drawn between conversion and selectivity.

Reaction temperatures exceed about 500°F, and are usually above about 600°F, preferably between 600° and 900°F. Hydrogen addition rates should be at least about 400, and are usually between about 2,000 and about 15,000 standard cubic feed per barrel. Reaction pressure exceed 200 psig and are usually within the range of about 500 to about 3,000 psig. Contact times usually correspond to liquid hourly space velocities in fixed bed catalytic systems less than about 15, preferably between about 0.2 and about 10.

Overall conversion rate is primarily controlled by reaction temperature and liquid hourly space velocity. However, selectivity is generally inversely proportional to reaction temperature. It is not as severely affected by reduced space velocities at otherwise constant conversion. Conversely, selectivity is usually improved at higher pressures and hydrogen addition rates. Thus, the most desirable conditions for the conversion of a specific feed to a predetermined product can be best obtained by converting the feed at several different temperatures, pressure, space velocities and hydrogen addition rates, correlating the effect of each of these variables and selecting the best compromise of overall conversion and selectivity.

These conditions should be chosen so that the overall conversion rate will correspond to the production of at least about 40 percent, and preferably at least about 50 percent of products boiling below about 700°F per pass. Midbarrel selectivity should be at least about 40, preferably at least about 50 percent. However, these processes allow the maintenance of conversion levels in excess of about 50 percent per pass at selectivities in excess of 60 percent to midbarrel fuels boiling between 400° and 700°F.

The catalyst should contain less than about 50, preferably less than about 30 weight percent of the zeolite based on the dry weight of zeolite and refractory oxide. However, zeolite content should exceed 0.5 and is usually above 2 weight percent.

One or more of a variety of refractory oxides can be employed in the support. Illustrative oxides include alumina, silica, magnesia, zirconia, beryllia, titania, and combinations thereof. Presently preferred compositions include amorphous oxides of which at least about 50 weight percent is either alumina or silica-magnesia.

The hydrogenation components include molybdenum, tungsten, nickel and cobalt metals, oxides and sulfides. Preferred compositions contain in excess of about 5 weight percent, preferably about 5 to about 40 weight percent molybdenum and/or tungsten, and at least about 0.5, and generally about 1 to about 15 weight percent of nickel and/or cobalt determined as the corresponding oxides. The sulfide form of these metals is most preferred due to higher activity, selectivity and activity retention.

The hydrogenation components can be added by any one of numerous procedures. They can be added either to the zeolite or the alumina or a combination of both. In the alternative, the Group VIII components can be added to the zeolite by comulling, impregnation, or ion exchange and the Group VI components, i.e., molybdenum and tungsten, can be combined with the refractory oxide by impregnation, comulling or co-precipitation.

Although these components can be combined with the catalyst support as the sulfides, that is generally not the case. They are usually added as a metal salt which can be thermally converted to the corresponding oxide in an oxidizing atmosphere or reduced to the metal with hydrogen or other reducing agent. The composition can then be sulfided by reaction with a sulfur donor such as carbon bisulfide, hydrogen sulfide, hydrocarbon thiols, elemental sulfur, and the like.

The zeolites should have either a faujasite or a zeolite L crystalline structure. Combinations of these zeolites with each other or with other zeolites can also be used. Preferred compositions are those in which at least a portion of the zeolite has a faujasite crystal structure. These zeolites are further characterized by silica-to-alumina mole ratios in excess of about 3 and alkali-metal contents less than about 1 and preferably less than about 2 weight percent determined as a corresponding alkali metal oxide.

The original alkali-metal of the zeolite as produced is replaced by ion exchange with hydrogen precursors or hydrogen ions. Other cations are not preferred although these can be present in nominal insignificant amounts.

In contrast to the pre-existing preference for zeolites having uniform pore distributions, these aluminosilicates are characterized by non-uniform pores. At least about 25 volume percent of the zeolite pore volume is contained in pores having diameters greater than 20 angstroms and at least 17 percent in pores having diameters greater than 40 angstroms. However, at least about 20 volume percent of the pore volume in both the faujasite and L-type zeolites will be contained in pores having diameters less than about 20 angstroms. Thus the pore distributions are much broader than the zeolites as manufactured.

I have discovered that these zeolites can be produced by severely steaming an exchanged zeolite having a low alkali-metal content, e.g., less than about 5 and preferably below about 3 weight percent, as the oxide. This treatment includes steaming for a period of at least about 30 minutes and preferably in excess of about 1 hour in the presence of at least about 1 psi and usually at least about 10 psi water vapor pressure at a temperature in excess of about 600°F. Saturated steam is presently preferred.

Steaming temperatures are usually within a range of about 600° to about 1,000°C. Longer steaming periods are required at the lower temperatures and/or water partial pressures. Thus, water partial pressure, temperature and exposure time must be correlated to obtain the desired characteristics such as pore size distribution and stability to thermal, hydrothermal, ammonia and acid environments. This step also noticeably reduces unit cell constant ($a_0$). For example, the preferred faujasites will usually have cell constants below about 24.5 A, preferably between about 24.40 and about 24.5 A.

The most preferred composition are prepared by steaming an ammonium or unstabilized hydrogen form of the faujasite or L zeolite, synthetic zeolite being preferred. At this stage, the zeolite preferably contains less than about 5, usually less than about 3 weight percent alkali-metal determined as the corresponding oxide. The ammonium form of the zeolite can be readily obtained by exchanging the alkali-metal zeolite with an aqueous solution of an ionizable ammonium salt such as ammonium chloride, ammonium sulfate, amine or tetraamine salts, and the like.

The unstabilized hydrogen zeolite can be prepared by treating the zeolite with a mild solution of an organic or inorganic acid such as hydrochloric, sulfuric, nitric, phosphoric, phosphorous, acetic, oxalic, and formic acids and the like. However, care must be taken to maintain sufficiently high pH levels to avoid excessive damage to the zeolite crystal structure or chemical properties by acid attack. Thus, pH levels of 1, preferably above 2 can be used. The unstabilized hydrogen zeolites are those which have been exchanged with hydrogen ion but have not been thermally stabilized.

Although the procedure is less preferred due to the multiplicity of steps involved, the zeolite can be exchanged with both hydrogen and hydrogen precursor ions concurrently or sequentially, or may be calcined at a relatively mild temperature, e.g., below about 1,000°F, prior to the severe steaming step.

In addition to superior activity and midbarrel selectivity, these compositions possess other advantages such as the retention of activity, selectivity, crystal structure, exchange capacity and other zeolitic properties upon exposure to both processing and regeneration conditions. For example, the hydrothermal stability of these compositions is such that little loss in activity or zeolite structure or other zeolitic properties is observed even under relatively severe rehydration and recalcination conditions.

A particularly preferred composition can be prepared by exchanging a sodium faujasite having silica-to-alumina ratio in excess of about 3 with an aqueous solution of an ammonium salt under conditions sufficient to reduce the alkali-metal content to less than 5 weight percent $Na_2O$. However, the sodium level is preferably not reduced substantially below 1 percent $Na_2O$ at this point so that the steamed product contains at least about 1 percent $Na_2O$ and retains at least about 0.2 percent exchangeable sodium determined as $Na_2O$.

The zeolite is then steamed at a temperature in excess of 600°C for at least 30 minutes in an atmosphere characterized by at least about 1 and preferably at least about 10 psi water partial pressure. Introduction of saturated steam into the steaming zone is presently preferred.

The steamed zeolite is then re-exchanged to reduce the sodium content to less than about 2 percent, usually less than about 1 and preferably less than 0.8 percent, determined as $Na_2O$. During this exchange the amount of ammonium and/or other hydrogen precursor ions exchanged into the zeolite should be sufficient to occupy at least about 2 and preferably at least about 5 relative percent of the original zeolite exchange capacity. For example, synthetic sodium faujasite as manufactured usually contains about 12 percent sodium determined as $Na_2O$. Thus, the amount of hydrogen ion precursor introduced following the high temperature steaming should correspond to about 0.2, preferably about 0.5 weight percent $Na_2O$ or more.

Following the second exchange, the zeolite is thermally treated under relative mild conditions compared to the previous steam treatment, preferably in the absence of substantial water partial pressure. Water partial pressure during this step is preferably below 5 and even more preferably below about 1 psi. Calcination temperature should be at least about 600°F. However, it should not exceed about 1,200°F and is preferably less than about 1,000°F.

A wide variety of procedures can be employed for combining the zeolite with the refractory oxides exemplary of which are alumina, silica, zirconia, magnesia, beryllia and the like; alumina, silica, magnesia and combinations thereof being preferred. For example the zeolite can be mulled with a hydrogel of the oxide followed by partial drying if required and extruding, pelletizing or the like to form particles of the desired shape. Alternatively, the refractory oxide can be precipitated in the presence of the zeolite. This is accomplished by increasing the pH of a solution of a refractory oxide precursor such as sodium aluminate, sodium silicate and the like. As described above, the combination can then be partially dried as desired, tableted, pelleted, extruded, or formed by other means and then calcined, e.g., at a temperature above 600°, usually above 800°F.

Hydrogenation components can be incorporated at any one of a number of stages in the catalyst preparation. For example, metal compounds such as the sulfides, oxides or water-soluble salts such as ammonium heptamolybdate, ammonium tungstate, nickel nitrate, cobalt sulfate and the like can be added by comulling, impregnation or precipitation to either the zeolite or the refractory oxide or the combination of both before the zeolite is finally calcined and combined with aluminum or after its final calcination but before combination with the refractory oxide. In the alternative theseh components can be added to the finished particle by impregnation with an aqueous or hydrocarbon solution of soluble comoounds or precursors.

I have discovered that a composition particularly preferred for hydrocracking gas-oils and similar high boiling feeds for the selective production of midbarrel fuels can be prepared which exhibits activity and selectivity superior to other compositions encompassed by the broad concept of this invention. In this embodiment the ammonium-stabilized hydrogen form of zeolite obtained after re-changing the steamed zeolite with hydrogen precursor ions is combined with a refractory oxide, preferably in a particulate form suitable for later application as a conversion catalyst, prior to calcination. By this procedure the zeolite still containing a substantial amount of hydrogen precursor ions, e.g., ammonium ions, is finally calcined while in admixture with the refractory oxide, preferably alumina or silica-magnesia.

As illustrated by the example hereinafter detailed, compositions prepared in this manner exhibit both activity and midbarrel selectivity superior to compositions prepared from zeolites which are finally calcined prior to combination with a refractory oxide. In the last mentioned instance, the zeolite would be thermally treated before combining with alumina, silica, or the like so that all of the hydrogen precursor ions contained therein are converted to hydrogen ions. That is not the case in the most preferred embodiment which, as mentioned above, results in the production of catalysts having even better activity in midbarrel selectivity. Thus, midbarrel hydrocracking processes employing the compositions described in this embodiment are presently most preferred.

Example 1

This example demonstrates the preparation of the preferred catalysts for use in these methods. A 1,000 gram portion of a synthetic faujasite having a loss on ignition of about 50 weight percent was ammonium exchanged with a solution of 500 grams of ammonium sulfate in 2,000 ml water. Exchange was continued with agitation for 1 hour at 200°F. The zeolite was recovered by filtration and exchanged a second time in a similar solution for 2 hours at 200°F.

The zeolite was then steamed in a preheated furnace at 800°C for 1 hour. The steam atmosphere was maintained by covering the zeolite container during heating to trap released water vapor. The steamed zeolite was then re-exchanged twice with excess ammonium sulfate as described above, water-washed and dried at 110°C.

The zeolite pore size distribution was determined with an Aminco Adsorptomat manufactured by American Instrument Company, Silver Springs, Md., in accordance with the instrument manual published October, 1966. Page 39 of this manual gives the computer data reduction procedure for determining pore size distribution from the nitrogen desorption isotherm. That procedure was employed in this and the following examples. Pores having diameter greater than 20 angstroms accounted for 29.0 percent of the pore volume, while 22.9 percent of the pore volume was accounted by pores having diameters greater than 40 angstroms.

The catalyst base was prepared by mixing and extruding alumina and the dried zeolite in proportions corresponding to 10 weight percent zeolite and 90 weight percent alumina. The extrudates were then calcined at 900°F for 2 hours. Nickel and tungsten were added to the extrudates by impregnation with an aqueous solution of nickel nitrate hexahydrate and ammonium tungstate in proportions sufficient to produce a final compositions containing 4.8 weight percent NiO and 26.6 weight percent $WO_3$. The impregnated extrudates were calcined at 900°F for 1 hour and sulfided with hydrogen sulfide.

EXAMPLE 2

The feed to all of these examples was a gas-oil fraction having the following characteristics.

| | |
|---|---|
| Gravity, API | 22.3 |
| Sulfur, Wt.% | 2.91 |
| Nitrogen, Total, Wt.% | 0.082 |
| D-1160 Engler, °F | |
| IBP | 584 |
| 5% | 696 |
| 10/20 | 727/763 |
| 30/40 | 793/815 |
| 50/60 | 837/857 |
| 70/80 | 873/902 |
| 90/95 | 930/955 |
| EP | 986 |

The feed was converted in a fixed bed down flow reactor using the catalyst of Example 1 at 1.5 LHSV, 2,000 psig and a hydrogen addition rate of 10,000 standard cubic feet per barrel of hydrocarbon. The reaction temperature required to obtain 50 percent conversion to products boiling below 570° was 745°F. Turbine fuel efficiency (the percent of total 570°F E.P. product boiling between 300° and 570°F) was 71 percent. A temperature increase of 17°F was required to double the conversion rate to 570°F products.

EXAMPLE 3

This example illustrates the preparation of a comparison prior art catalyst prepared from a low sodium ammonium Y zeolite containing 0.4 weight percent sodium metal. A sodium Y zeolite was repeatedly exchanged with ammonium sulfate solution until the sodium level was reduced to 0.4 percent. This material had a relatively narrow pore size distribution in which 15.0 percent of the pore volume was contained in pores having diameters greater than 20 angstroms and only 10.2 percent in pores having diameters greater than 40 angstroms.

Extrudates of this zeolite and alumina were prepared from a mix containing 10 weight percent zeolite and 90 percent alumina on a dry weight basis. The extrudates were calcined at 900°F for 2 hours and impregnated and activated as described in Example 1. The final composition contained 4.6 weight percent NiO and 27.5 weight percent $WO_3$.

EXAMPLE 4

The catalyst of Example 3 was used to convert the feed described in Example 2 under the same conditions. A reaction temperature of 752°F was required to obtain 50 percent conversion to products boiling below 570°F. Turbine fuel selectivity was 55 percent.

TABLE 1

| Ex. No. | 2 | 4 |
|---|---|---|
| Composition Wt.% | | |
| Zeolite | 10 | 10 |
| NiO | 4.8 | 4.6 |
| $WO_3$ | 26.6 | 27.5 |
| Temp. °F., 50% to 570 | 745 | 752 |
| Selectivity, % | 71 | 55 |

EXAMPLE 5

Another preferred composition of this invention containing 4.1 weight percent NiO and 22.8 weight percent $WO_3$ was prepared from a support containing 20 weight percent zeolite and 80 weight percent alumina as described in Example 1. The zeolite had a broad pore size distribution as indicated by the occurrence of 37.7 percent of the pore volume in pore diameters greater than 20 angstroms and 26.1 percent in pores having diameters greater than 40 angstroms.

EXAMPLE 6

The catalyst of Example 5 was used to hydrocrack the feed described in Example 2 under identical conditions with the exception that reaction pressure was reduced to 1,800 psig. At 735°F this catalyst was sufficiently active to convert 80 percent of the feed to fuel oil products boiling below 685°F.

EXAMPLE 7

The method of Example 5 was repeated using a large pore zeolite prepared by calcining the re-exchanged zeolite before combination with refractory oxide. This zeolite was prepared by repeatedly exchanging a sodium Y zeolite identical to the starting material employed in Example 1 with ammonium sulfate, and then steaming and re-exchanging with ammonium ion as described in Example 1. However, prior to combination with the refractory oxide the zeolite was calcined at 800°C for 1 hour. This material had a final sodium content of 0.3 weight percent and a broad pore size distribution in which 43.5 percent of the pore volume was contained in pores having diameters of 20 angstroms or more and 29.5 percent in pores of 40 angstroms or more diameter.

This material was combined with sufficient alumina to produce extrudates containing 20 weight percent zeolite and 80 weight percent alumina on a dry weight basis. The extrudates were calcined at 900°F for 2 hours. Nickel and tungsten were then added by impregnation with aqueous nickel nitrate hexahydrate and ammonium tungstate in proportions sufficient to produce a catalyst having a composition equivalent to 3.9 weight percent Nio and 22.3 weight percent $WO_3$. The impregnated extrudates were finally calcined at 900°F for 1 hour.

EXAMPLE 8

The catalyst of Example 7 was used to convert the feed described in Example 2 to furnace oil products under conditions identical to those described in Example 6. At a temperature of 735°F, 66.5 percent of the feed was converted to products boiling below 685°F.

EXAMPLE 9

A comparison catalyst was prepared from a zeolite similar to that described in Example 3. This zeolite was prepared by repeatedly exchanging sodium zeolite Y with ammonium sulfate until the final sodium level corresponded to 1.7 weight percent $Na_2O$. This material was then calcined in dry air at 930°F for 1 hour. The resultant pore distribution was relatively narrow as indicated by the occurrence of only 17.1 percent of the pore volume in pores having 20 angstroms diameters or greater, and only 9.8 percent in pores larger than 40 angstroms.

The zeolite was extruded with alumina in amounts corresponding to 20 weight percent zeolite and 80 weight percent alumina and calcined for 3 to 4 hours at 600°C. The extrudates were impregnated with an aqueous solution of ammonium tungstate, calcined at 950°F for 2 to 3 hours, impregnated with nickel nitrate hexahydrate and calcined at 950°F for 4 hours. The final composition contained amounts of nickel and tungsten corresponding to 4.9 weight percent NiO and 24.8 weight percent $WO_3$.

EXAMPLE 10

The comparison catalyst of Example 9 was used to convert the feed described in Example 2 to midbarrel fuels boiling below 685°F under the conditions employed in Example 6 and 8. A temperature of 754°F was required to obtain 65 percent of conversion to products boiling below 685°F. At this temperature the turbine fuel selectivity was 54.7 percent.

TABLE 2

| Ex. No. | 6 | 8 | 10 |
|---|---|---|---|
| Composition | | | |
| Zeolite | 29 | 20 | 20 |
| NiO | 4.1 | 3.9 | 4.9 |
| $WO_3$ | 22.8 | 22.3 | 24.8 |
| Conversion, % to 685°F | 80 | 66.5 | 65 |
| Temperature, °F | 735 | 735 | 754 |

EXAMPLE 11

The catalyst of Example 7 was used to convert the feed described in Example 2 under the conditions used in Example 2. A temperature of 731°F was required to obtain 50 percent conversion per pass to products boiling below 570°F. Turbine fuel selectivity was 54.9 percent. Thus this composition produced as much turbine fuel as the catalyst of Example 9 (used in Example 10) at a reaction temperature 23°F lower than that required in Example 10.

EXAMPLE 12

A catalyst was prepared from a base containing 20 weight percent of the zeolite of Example 1 and 80 weight percent alumina. The extrudates was impregnated with nickel and tungsten in amounts sufficient to provide a final composition containing 4.9 weight percent NiO and 25.4 weight percent $WO_3$. This material was used with the feed and under the conditions described in Example 2 to produce midbarrel fuels boiling below 570°F. A temperature of 722°F was required to obtain 50 percent conversion per pass to products boiling below 570°F. The turbine fuel selectivity was 66.8 percent.

EXAMPLE 13

The operation of Example 12 was repeated at a temperature of 730°F, one degree lower than the temperature required to obtain 50 percent conversion in Example 11 with the catalyst of Example 7. A conversion of 83 percent to products boiling below 570°F was obtained under these conditions.

EXAMPLE 14

A catalyst similar to that described in Example 1 containing only 5 weight percent zeolite, 4.3 percent NiO and 20.5 weight percent $WO_3$ was used to convert the feed described in Example 2 under the same conditions. A temperature of 749°F was required to obtain 50 percent conversion per pass to products boiling below 570°F.

TABLE 3

| Ex. No. | 11 | 12 | 13 | 14 |
|---|---|---|---|---|
| Composition, Wt.% | | | | |
| Zeolite | 20 | 20 | 20 | 5 |
| NiO | 3.9 | 4.9 | 4.9 | 4.3 |
| $WO_3$ | 22.3 | 25.4 | 25.4 | 20.5 |
| Temperature, °F | 731 | 722 | 730 | 749 |
| Conversion, % to 570°F | 50 | 50 | 83 | 50 |
| Selectivity, % 300–570°F | 54.9 | 66.8 | n.a. | 73.3 |

The following examples illustrate several additional advantages of the preferred compositions including thermal, hydrothermal, acid and reammoniation stability. These characteristics are particularly relevant in midbarrel hydrocracking processes wherein the catalyst may be exposed during either preparation, use or regeneration to acidic, thermal, hydrothermal or ammonia-containing enviroments.

EXAMPLE 15

This composition consisted of extrudates containing 50 weight percent alumina and 50 weight percent of a zeolite prepared by the method described in Example 1. The composition contains 0.1 weight percent sodium determined as $Na_2O$ and had a surface area of 557 square meters per gram. The extrudates contained 38 weight percent crystalline material determined by X-ray spectra in relation to the laboratory standard. Accordingly, the residual zeolite crystallinity was approximately 76 percent.

EXAMPLE 16

A comparison catalyst was prepared by repeatedly exchanging a sample of sodium zeolite Y with aqueous ammonium sulfate under conditions sufficient to reduce the sodium content to 1.7 weight percent Na₂O. This material was then extruded with alumina in amounts sufficient to produce extrudates containing 50 weight percent zeolite and 50 weight percent alumina on a dry weight basis. After calcination in dry flowing air at 900°F the extrudates had a surface area of 554 square meters per gram and residual crystallinity of 25 percent compared to the laboratory standard referred to in Example 15.

EXAMPLE 17

The rehydration stability of the compositions of Examples 15 and 16 was evaluated by suspending a sample of each composition over water in saturated air at 70°F for 16 hours and calcining at 900°F for 1 hour. The composition of Example 15 had a residual crystallinity of 35 percent compared to 38 percent for the original extrudate. Its surface area was 380 square meters per gram. In contrast, the composition of Example 16 retained no crystallinity whatever and had a residual surface area of only 137 M²/g.

EXAMPLE 18

The reammoniation stability of the compositions of Examples 15 and 16 was evaluated by the following procedure. The calcined extrudates were rehydrated in water saturated air at about 70°F for 16 hours. The hydrated zeolites were then suspended in a packed column and contacted with 100 percent ammonia gas passed upwardly through the zeolite bed for about 2½ hours. The extrudates were then purged with dry nitrogen at 70°F for 16 hours to remove excess ammonia and each material was calcined in flowing dry air at about 900°F.

Residual crystallinity and surface area were determined by X-ray diffraction and nitrogen desorption respectively. The composition of Example 15 had a residual crystallinity of 35 percent and a surface area of 502 square meters per gram. In contrast the crystallinity of the composition of Example 16 had been reduced to 14 percent. Its surface area had descreased to 380 square meters per gram.

EXAMPLE 19

Each of the materials produced in Example 18 were subjected to the rehydration-recalcination test described in Example 17. X-ray analysis indicated the presence of about 36 relative percent crystallinity in the composition of the Example 15. Accordingly, no further reduction in crystallinity resulted from rehydration of the ammoniated material. In contrast, the crystalline structure of the composition of Example 16 was almost completely destroyed by rehydration and recalcination of the ammoniated extrudates as indicated by the retention of only 2 percent crystallinity in the product.

TABLE 4

| Extrudates of Example | 15 | 16 |
|---|---|---|
| Original | | |
| Crystallinity, % | 38 | 25 |
| Surface Area, M²/g | 557 | 554 |
| Rehydration Product | | |
| Crystallinity, % | 35 | 0 |
| Surface Area, M²/g | 380 | 137 |
| Ammoniation Product | | |
| Crystallinity, % | 35 | 14 |
| Surface Area, M²/g | 502 | 308 |
| Rehydration Ammoniation Product | | |
| Crystallinity, % | 36 | 2 |

EXAMPLE 20

The acid stability of the compositions of Examples 15 and 16 was evaluated by contacting each material with aqueous solutions of phosphoric acid at different pH levels and determining the crystallinity and surface area loss following acid treatment and recalcination. In each instance a 5 gram portion of the extrudate was immersed in 50 ml aqueous phosphoric acid at the indicated pH level. The compositions were contacted in these solutions for equal periods of 60 minutes. The treated extrudates were washed free of excess acid, dried at 75°F in flowing ambient air for 16 hours and calcined at 900°F for 1 hour. The results of these studies are presented in Table 5.

TABLE 5

| Composition of Example No. | 15 | | 16 | |
|---|---|---|---|---|
| | Cryst.,% | S.A., M²/g | Cryst.,% | S.A.,M²/g |
| pH 3.1 | | | | |
| Uncalcined | 39 | 487 | 23 | 387 |
| Calcined | 35 | 508 | 3 | 205 |
| pH 1.6 | | | | |
| Uncalcined | 27 | 463 | 22 | 322 |
| Calcined | 27 | 447 | 2 | 170 |
| pH 1.1 | | | | |
| Uncalcined | 11 | 329 | 3 | 174 |
| Calcined | 8 | 258 | 0 | 71 |

I claim:

1. The method of selectivity converting hydrocarbons boiling above about 700°F to midbarrel fuel products boiling between about 300° and 700°F including the steps of reacting said hydrocarbons with hydrogen under hydrocracking conditions including a temperature of at least about 500°F, a pressure of at least about 200 psig and a hydrogen addition rate of at least about 400 SCF/bbl of said hydrocarbons sufficient to convert at least about 40 volume percent of said hydrocarbons per pass to products boiling below about 700°F with at least about 50 percent midbarrel selectivity in the presence of a catalytic combination of a crystalline aluminosilicate zeolite, an amorphous refractory inorganic oxide, and a hydrogenation component selected from nickel, tungsten, cobalt and molybdenum metals, oxides and sulfides, wherein said zeolite constitutes less than about 50 weight percent of said combination based on the combined weight of said zeolite and refractory oxide and is characterized by a crystal structure corresponding to faujasite or zeolite L, a silica-to-alumina mole ratio of at least about 3, a sodium content corresponding to less than about 2 weight percent Na₂O, and a non-uniform pore size distribution in which at least 25 percent of the pore volume is contained in pores having diameters greater than about 20 angstroms and at least about 17 percent in pores having diameters greater than about 40 angstroms.

2. The method of claim 1 wherein said zeolite is further characterized by a cell constant less than about 24.5 and a hydrothermal stability sufficient to retain a predominance of the zeolite crystal structure upon rehydration with water and calcination at 590°C. for 2 hours.

3. The method of claim 2 wherein the sodium content of said zeolite corresponds to less than about 1 weight percent $Na_2O$ and said catalyst is prepared by the method including the steps of steaming the hydrogen precursor form of said zeolite in the presence of at least about 1 psi water vapor pressure at a temperature of at least about 600°C. for at least about 30 minutes.

4. The method of claim 3 wherein said zeolite has a faujasite crystal structure and is further characterized by stability to reammoniation evidenced by the retention of a predominance of the zeolite crystal structure upon rehydration, saturation with ammonia gas and calcination at 900°F for 2 hours.

5. The method of claim 1 wherein at least about 90 volume percent of said hydrocarbons boil between about 700° and about 1,200°F. and are reacted with said hydrogen added to a rate of about 2,000 to about 15,000 standard cubic feet per barrel of said hydrocarbons in the presence of said catalyst at a temperature between about 600° and about 900°F, a pressure of about 500 to about 3,000 psig and a liquid hourly space velocity less than about 15 sufficient to convert at least about 50 percent of said hydrocarbons per pass to products boiling below about 700°F. with a selectivity of conversion of at least about 60 percent to midbarrel fuels boiling between about 300° and about 700°F.

6. The method of claim 5 wherein said catalyst comprises at least about 5 weight percent of at least one of molybdenum and tungsten sulfides, said zeolite has a faujasite crystal structure and constitutes less than about 30 weight percent of the combined weight of said zeolite and said refractory oxide, said refractory oxide comprises at least about 50 weight percent alumina, and said feed is reacted with said hydrogen in the presence of said composition under conditions sufficient to convert said hydrocarbons with at least about 60 percent selectivity of conversion to midbarrel fuels boiling between about 400° and about 700°F.

7. The method of claim 1 wherein said refractory oxide is selected from alumina, silica-magnesia, and combinations thereof, and said zeolite has a crystal structure corresponding to synthetic zeolite Y.

8. The method of claim 3 wherein said zeolite has a crystal structure corresponding to synthetic zeolite Y, said refractory oxide comprises alumina, silica-magnesia and combinations thereof, and said catalytic combination is prepared by (a) steaming the hydrogen precursor form of said zeolite containing less than about 5 but at least about 1 weight percent sodium determined as $Na_2O$ in the presence of at least about 1 psi steam and a temperature of at least about 600°C for a period of at least about 30 minutes sufficient to produce said non-uniform pore size distribution, (b) exchanging the steamed zeolite in the hydrogen precursor ions in amounts sufficient to reduce its sodium level to less than 1 percent determined as $Na_2O$, (c) intimately admixing to hydrogen ion precursor containing zeolite with said refractory oxide, and (d) calcining the combination of said zeolite and said refractory oxide at a temperature between about 600° and about 1,200°F.

* * * * *